United States Patent
Bedekar et al.

(10) Patent No.: US 7,047,310 B2
(45) Date of Patent: May 16, 2006

(54) FLOW CONTROL IN A PACKET DATA COMMUNICATION SYSTEM

(75) Inventors: Anand S. Bedekar, Arlington Heights, IL (US); Rajeev Agrawal, Northbrook, IL (US); Rajeev Ranjan, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 320 days.

(21) Appl. No.: 10/374,553

(22) Filed: Feb. 25, 2003

(65) Prior Publication Data

US 2004/0165530 A1  Aug. 26, 2004

(51) Int. Cl.
G06F 13/00 (2006.01)

(52) U.S. Cl. .................. 709/232; 709/233; 370/230; 370/231; 370/232; 370/233; 370/234; 370/235; 370/328; 370/338; 370/401

(58) Field of Classification Search ........ 370/230–235, 370/328, 338, 401
See application file for complete search history.

(56) References Cited

U.S. PATENT DOCUMENTS

| | | | | |
|---|---|---|---|---|
| 5,455,826 A * | 10/1995 | Ozveren et al. | ............ | 370/232 |
| 5,566,175 A * | 10/1996 | Davis | ............ | 370/468 |
| 5,734,825 A * | 3/1998 | Lauck et al. | ............ | 709/233 |
| 5,914,936 A | 6/1999 | Hatono et al. | | |
| 5,968,128 A * | 10/1999 | Lauck et al. | ............ | 709/232 |
| 5,995,486 A * | 11/1999 | Iliadis | ............ | 370/229 |
| 6,088,622 A * | 7/2000 | Dollin et al. | ............ | 700/28 |
| 6,147,970 A * | 11/2000 | Troxel | ............ | 370/235 |
| 6,192,029 B1 * | 2/2001 | Averbuch et al. | ............ | 370/229 |
| 6,212,200 B1 * | 4/2001 | Iizuka et al. | ............ | 370/468 |
| 6,252,848 B1 * | 6/2001 | Skirmont | ............ | 370/229 |
| 6,298,041 B1 * | 10/2001 | Packer | ............ | 370/231 |
| 6,438,138 B1 * | 8/2002 | Kamiya | ............ | 370/468 |
| 6,510,160 B1 * | 1/2003 | Nikuie et al. | ............ | 370/412 |
| 6,578,083 B1 * | 6/2003 | Tuck, III | ............ | 709/235 |
| 6,701,389 B1 * | 3/2004 | Gorti et al. | ............ | 710/29 |
| 6,724,776 B1 * | 4/2004 | Jeffries | ............ | 370/468 |
| 6,771,652 B1 * | 8/2004 | Aydemir et al. | ............ | 370/412 |
| 2004/0057378 A1 * | 3/2004 | Gronberg | ............ | 370/230 |

* cited by examiner

*Primary Examiner*—Zarni Maung
*Assistant Examiner*—Van Kim T. Nguyen
(74) *Attorney, Agent, or Firm*—Steven A. May (57) ABSTRACT

A communication system that includes multiple nodes controls a flow of data from a first node of the multiple nodes to a second node of the multiple nodes without relying on an estimate of a rate at which data is drawn from a buffer of the second node and such that an overflow and an underflow of the buffer is avoided. The second node determines multiple flow control parameters, including a current occupancy (Q) of the buffer and an upper threshold (U) and a lower threshold (L) for an occupancy of the buffer and determines a desired data rate (r) based on the multiple flow control parameters. The desired data rate can be used to adjust a data rate for the flow of data. In another embodiment, the communication system further dynamically controls a rate at which flow control messages are conveyed by the second node to the first node.

29 Claims, 8 Drawing Sheets

FLOW CONTROL IN A PACKET DATA COMMUNICATION SYSTEM

FIELD OF THE INVENTION

The present invention relates generally to cellular communication systems, and, in particular, to flow control in a packet data communication system.

BACKGROUND OF THE INVENTION

The General Packet Radio Service (GPRS) standard provides a compatibility standard for cellular mobile telecommunications systems. The GPRS standard ensures that a mobile station (MS) operating in a GPRS system can obtain communication services when operating in a system manufactured according to the standard. To ensure compatibility, radio system parameters and data transfer procedures are specified by the standard, including protocols governing digital control messages and bearer traffic that are exchanged between elements of an infrastructure.

Figure 1:
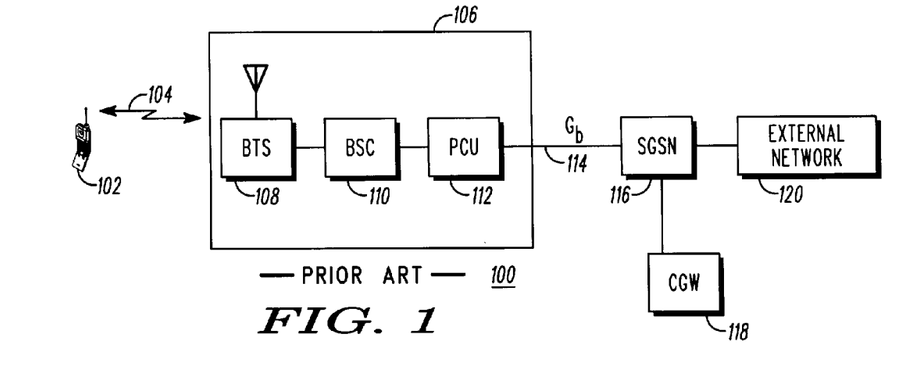
FIG. 1 is a block diagram of a wireless communication system of the prior art.

FIG. 1 is a block diagram illustration of a typical GPRS communication system 100 of the prior art. Communication system 100 includes an MS 102 in communication with a base station subsystem (BSS) 106, and specifically with a base transceiver station (BTS) 108 included in the BSS, via an air interface 104. Typically, data is transferred between MS 102 and BTS 108 over air interface 104 pursuant to a Radio Link Control (RLC). BSS 106 further includes a base station controller (BSC) 110 coupled to BTS 108 and a Packet Control Unit (PCU) 112 coupled to the BSC. Communication system 100 further includes a Serving GPRS Support Node (SGSN) 116 that is coupled to BSS 106, specifically PCU 112, via a Gb interface 114 that includes a bearer path between the BSS and the SGSN and a signaling interface. BSS 106 and SGSN 116 are collectively referred to as a system network or infrastructure.

When MS 102 engages in a communication session with an external network 120, data is conveyed to MS 102 via SGSN 116, PCU 112, BSC 110, and BTS 108. The data is typically included in data packets that are formatted pursuant to an Internet Protocol (IP) standard. SGSN 116 typically queues the received data in a buffer included in the SGSN and associated with MS 102 before conveying the data to MS 102 via BSS 106. In turn, BSS 106, and in particular PCU 112, typically queues the data received from SGSN 116 in a buffer included in the PCU and associated with MS 102 before conveying the data to the MS. SGSN 116 monitors the number of bytes received by the SGSN from external network 120 and/or sent by the SGSN to PCU 112 and keeps a count of the number of sent and/or received bytes. SGSN 116 then conveys a count of the number of bytes sent and/or received by the SGSN to a Charging Gateway (CGW) 118 in an accounting message. A billing service then retrieves accounting records that include the byte count from CGW 118 and bills a customer associated with MS 102 a fee based on the count of the bytes count.

In order to optimize the performance of communication system 100 and to correctly bill a customer of the communication system, the flow of data in the system must be controlled. A reduced rate of data transfer to MS 102 over the air interface 104 can result in an overflow of data to the buffer at PCU 112. In turn, an overflow of the PCU buffer can result in data packets being dropped by the PCU, for which dropped data packets the customer is billed. An increased rate of data transfer to MS 102 over the air interface 104 can result in an underflow of data to the PCU buffer, which can result in a starvation of the buffer and an inefficient utilization of the air interface 104.

In addition, as MS 102 moves through communication system 100, the MS may be handed off to a second BSS and a second PCU. Upon handing off of MS 102, PCU 112 is instructed by SGSN 116 to delete all data stored in the buffer of the PCU associated with MS 102. In the current implementation of a GPRS system such as system 100, dropped packets are either recovered by running the Logical Link Control (LLC) protocol in the "acknowledged" mode, by relying on end-to-end protocols (such as TCP), or are not recovered at all (for example, in voice-over-IP or other real-time critical applications). Relying on these forms of dropped packet recovery increases network delay, thus reducing network-level throughput. Furthermore, the byte count conveyed by SGSN 116 to CGW 118 does not reflect any data packets dropped by the infrastructure after being received by SGSN 116 from external network 120. As a result, data packets discarded by PCU 112 are not reflected in the billing of the customer associated with MS 102.

In order to regulate buffer overflows and underflows, the GPRS standards provide for a flow control message that is sent by a downstream network element, such as PCU 112, to an upstream network element, such as SGSN 116, to control the downstream flow of data. The standards specify that the flow control message specify two parameters, a data transfer rate (r) from the downstream element to the downstream element and a maximum burst size ($B_{max}$). The standards further specify that the flow control messages have a minimum spacing between messages. However, the standards do not indicate how to determine r, $B_{max}$, or the spacing.

In order to implement the flow control message, flow control schemes have been developed to determine the message's parameters. Typically, the flow control schemes are 'leaky bucket' schemes that involve a computation of both of the parameters r and $B_{max}$. However, none of the schemes ensure prevention of PCU buffer overflow or underflow. Furthermore, such flow control schemes require a large buffer at the PCU, which consumes excessive memory space and may result in a discard of an excessive amount data, and correspondingly excessive customer over-billing, as a result of cell reselection. In addition, such flow control schemes typically rely on estimated data transfer rates over air interface 104, the calculation of which is very complex and processing load intensive and which algorithms still do not insure against buffer overflows and underflows.

Therefore, a need exists for a method and apparatus that controls a flow of data from an SGSN to a PCU without causing an overflow or an underflow of the per_MS buffer in the PCU, that does not rely on estimated data transfer rates over an air interface, and that does not result in a discard of an excessive amount of data when a mobile station switches is handed over from the PCU to a different PCU.

DETAILED DESCRIPTION OF THE INVENTION

To address the need for a method and apparatus that controls a flow of data from an SGSN to a PCU without causing an overflow or an underflow of the per$_{13}$ MS buffer in the PCU, that does not rely on estimated data transfer rates over an air interface, and that does not result in a discard of an excessive amount of data when a mobile station switches is handed over from the PCU to a different PCU, a communication system that includes multiple nodes controls a flow of data from a first node of the multiple nodes to a second node of the multiple nodes without relying on an estimate of a rate at which data is drawn from a buffer of the second node and such that an overflow and an underflow of the buffer is avoided. The second node determines multiple flow control parameters, including a current occupancy (Q) of the buffer and an upper threshold (U) and a lower threshold (L) for an occupancy of the buffer and further determines a desired data rate (r) based on the multiple flow control parameters. The second node may then convey the desired data rate to the first node in a flow control message and the first node may use the desired data rate to adjust a data rate for the flow of data from the first node to the second node. In another embodiment, the communication system further dynamically controls a rate at which flow control messages are conveyed by the second node to the first node.

Generally, an embodiment of the present invention encompasses a method for controlling a data rate for a transfer of data from a first node of multiple nodes in a communication system to a second node of the multiple nodes. The method includes determining whether a period of time has expired since an immediately preceding flow control message has been conveyed by the second node to the first node, when the period of time has expired, determining multiple flow control parameters comprising a current occupancy (Q) of a buffer of the second node, an upper threshold (U) for an occupancy of the buffer, and a lower threshold (L) for an occupancy of the buffer and determining a desired data rate (r) based on the determined multiple flow control parameters, wherein the desired data rate can be used to adjust the data rate.

Another embodiment of the present invention encompasses a method for controlling a data rate for a transfer of data from a first node of multiple nodes in a communication system to a second node of the multiple nodes. The method includes determining whether a period of time has expired since a conveyance of a preceding flow control message from the second node to the first node and determining multiple flow control parameters including a current occupancy (Q) of a buffer of the second node, an upper threshold (U) for an occupancy of the buffer, a lower threshold (L) for an occupancy of the buffer, a quantity (q) corresponding to an amount by which the current occupancy (Q) of the buffer exceeds the lower threshold (L), and a quantity ($q_o$) corresponding to a value determined for the quantity q with respect to the preceding flow control message. The method further includes determining at least one of whether a difference between the quantity (q) and the quantity ($q_o$) exceeds an adjustment threshold (d), whether the quantity (q) is less than or equal to zero (0), and whether the quantity (q) is greater than or equal to a difference between the upper threshold (U) and the lower threshold (L) and determining to adjust the data rate when the period of time has expired and the difference between the quantity (q) and the quantity ($q_o$) exceeds the adjustment threshold (d), the quantity (q) is less than or equal to zero (0), or the quantity (q) is greater than or equal to a difference between the upper threshold (U) and the lower threshold (L).

Still another embodiment of the present invention encompasses a node in a wireless communication infrastructure, wherein the node receives data at a data rate from a different node in the communication system for transmission to a mobile station. The node includes at least one memory device comprising a buffer that stores data intended for mobile station and a processor that determines whether a period of time has expired since the node conveyed an immediately preceding flow control message to the different node and, when the period of time has expired, determines multiple flow control parameters including a current occupancy (Q) of the buffer, an upper threshold (U) for an occupancy of the buffer, and a lower threshold (L) for an occupancy of the buffer, determines a desired data rate (r) based on the determined multiple flow control parameters, and wherein the desired data rate can be used to adjust the data rate.

Yet another embodiment of the present invention encompasses a node in a wireless communication infrastructure, wherein the node receives data at a data rate from a different node in the communication system for transmission to a mobile station. The the node includes at least one memory device that stores an adjustment threshold (d) and that comprises a buffer that stores data intended for mobile station. The node further includes a processor that determines whether a period of time has expired since the node conveyed a preceding flow control message to the different node; determines multiple flow control parameters comprising a current occupancy (Q) of the buffer, an upper threshold (U) for an occupancy of the buffer, a lower threshold (L) for an occupancy of the buffer, a quantity (q) corresponding to an amount by which the current occupancy (Q) of the buffer exceeds the lower threshold (L), and a quantity ($q_o$) corresponding to a value determined for the quantity q with respect to the preceding flow control message, determines at least one of whether a difference between the quantity (q) and the quantity ($q_o$) exceeds the adjustment threshold (d), whether the quantity (q) is less than or equal to zero (0), and whether the quantity (q) is greater than or equal to a difference between the upper threshold (U) and the lower threshold (L), and determines to adjust the data rate when the period of time has expired and the difference between the quantity (q) and the quantity ($q_o$) exceeds the adjustment threshold (d), the quantity (q) is less than or equal to zero (0), or the quantity (q) is greater than or equal to a difference between the upper threshold (U) and the lower threshold (L).

Figure 2:
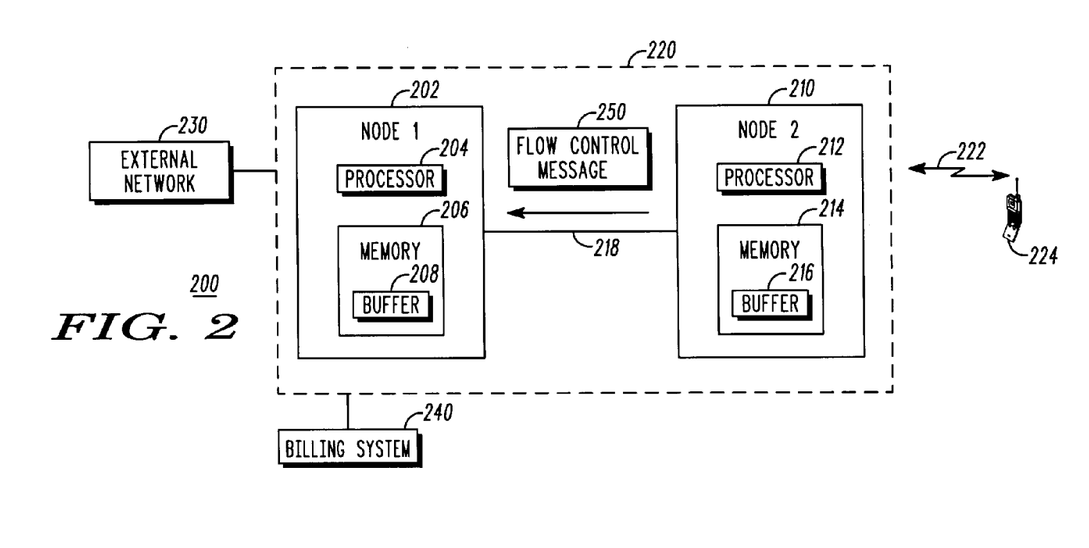
FIG. 2 is a block diagram of a communication system in accordance with an embodiment of the present invention.

The present invention may be more fully described with reference to FIGS. 2–8. FIG. 2 is a block diagram of a wireless communication system 200 in accordance with an embodiment of the present invention. Communication system 200 includes a first network node 202 that communicates with a second network node 210 via a network interface 218. Each network node 202, 210 is an element in a fixed wireless infrastructure 220, which wireless infrastructure provides wireless communication services over an air interface 222 to a mobile station (MS) 224, such as a cellular telephone, a radiotelephone, or a wireless modem that is coupled to or included in a data terminal, such as a personal computer, a laptop computer, a printer, or a fax machine. Wireless infrastructure 220 is further operably coupled to an external network 230 and to a billing system 240. Billing system 240 receives a count of a number of bytes received by infrastructure 220 and intended for MS 224. The billing system then bills a customer associated with MS 224 a fee based on the received byte count.

In communication system 200, first network node 202 transfers data to second network node 210 for routing by the second network node to MS 224. In one embodiment of the present invention, first network node 202 may be upstream from second network node 210. For example, first network node 202 may be a Serving GPRS Support Node (SGSN) and second network node 210 may be a Packet Control Unit (PCU), or first network node 202 may be a PCU and second network node 210 may be a base transceiver station (BTS). In another embodiment of the present invention, first network node 202 may be parallel to second network node 210, such as when each of network nodes 202 and 210 is a PCU.

Each node 202, 210 includes a respective processor 204, 212, such as one or more microprocessors, microcontrollers, digital signal processors (DSPs), combinations thereof or such other devices known to those having ordinary skill in the art. Each node 202, 210 further includes, or is associated with, one or more respective memory devices 206, 214, such as random access memory (RAM), dynamic random access memory (DRAM), and/or read only memory (ROM) or equivalents thereof, that store data and programs that may be executed by the component's processor. Each node 202, 210 further includes a respective data buffer 208, 216, that is included in the node's respective memory devices 206, 214 or otherwise associated with the node's respective processor 204, 212 and that is further associated with an MS, that is, MS 224, serviced by the node. Each data buffer 208, 216 stores data packets received by the respective node 202, 210, or originated by the upstream node of nodes 202 and 210, and intended for the associated MS. For example, when a node, such as nodes 202 and 210, is a PCU, then the node's buffer 208, 216 may be a per$_{13}$ MS buffer. By way of another example, when node 202 is an SGSN, then buffer 208 may be a synchronization buffer that stores data packets transmitted by the SGSN to a particular MS, that is, MS 224.

Communication system 200 comprises a wireless packet data communication system. In order for MS 202 to establish a packet data connection with an external network such as external network 230, each of the nodes 202 and 210 operates in accordance with well-known wireless telecommunications protocols. By operating in accordance with well-known protocols, a user of MS 202 can be assured that the MS will be able to communicate with infrastructure 220 and establish a packet data communication link with an external network, such as network 230, via the infrastructure. Preferably, communication system 200 operates in accordance with the General Packet Radio Service (GPRS) standard. The standard specifies wireless telecommunications system operating protocols, including radio system parameters and data transfer protocols. However, those who are of ordinary skill in the art realize that communication system 200 may operate in accordance with any one of a variety of wireless packet data communication systems, such as a Global System for Mobile communication (GSM) communication system, a Code Division Multiple Access (CDMA) communication system, a Time Division Multiple Access (TDMA) communication system, a Frequency Division Multiple Access (FDMA) communication system, or an Orthogonal Frequency Division Multiple Access (OFDM) communication system.

When data is transferred by node 202 to node 210 for routing to MS 224, node 210 buffers the data in buffer 216 before routing the data to the MS. The rate at which a node 202 conveys data to node 210 is premised on a rate of data transfer to MS 224 over air interface 222. In the prior art, when a downstream node is buffering data received from an upstream node before conveying the data to an MS, a change in the air transfer rate can result in an overflow or an underflow of a buffer in the downstream node. Furthermore, in the prior art, when the MS is handed off from the downstream node to a parallel downstream node, the data stored in the buffer of the downstream node may be dropped, which dropped data typically has already been billed to a customer associated with the MS. Therefore, communication system 200 provides a flow control mechanism that controls a flow of data from node 202 to node 210, preventing an overflow or underflow of buffer 216 in node 210 and minimizing a required size of buffer 216, thereby minimizing an amount of data that is dropped during a handover from node 210 to a node parallel to node 210 and further minimizing any over-billing of a customer associated with MS 224.

Figure 3:
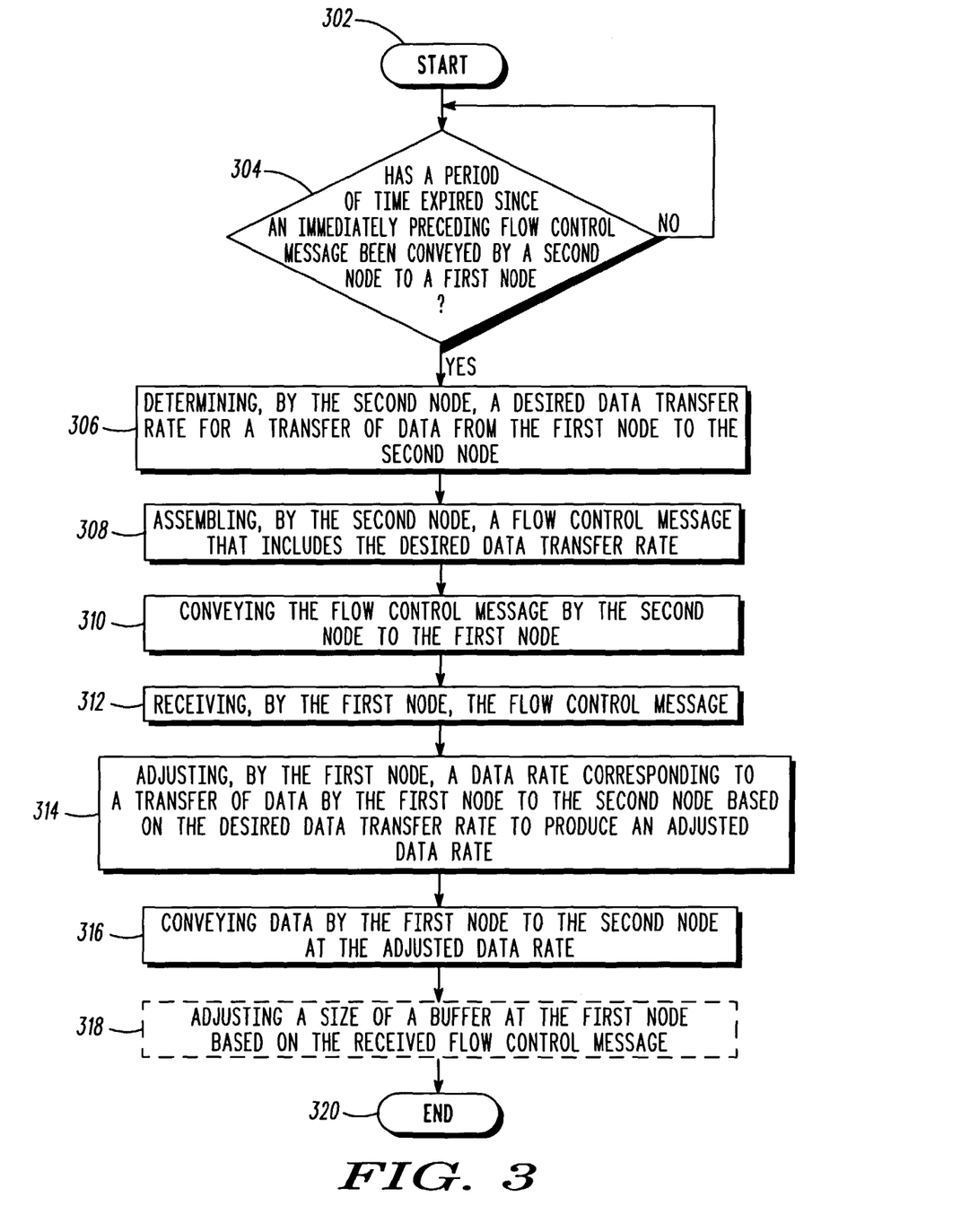
FIG. 3 is a logic flow diagram of a flow control mechanism of the communication system of FIG. 2 in accordance with an embodiment of the present invention.
Figure 4:
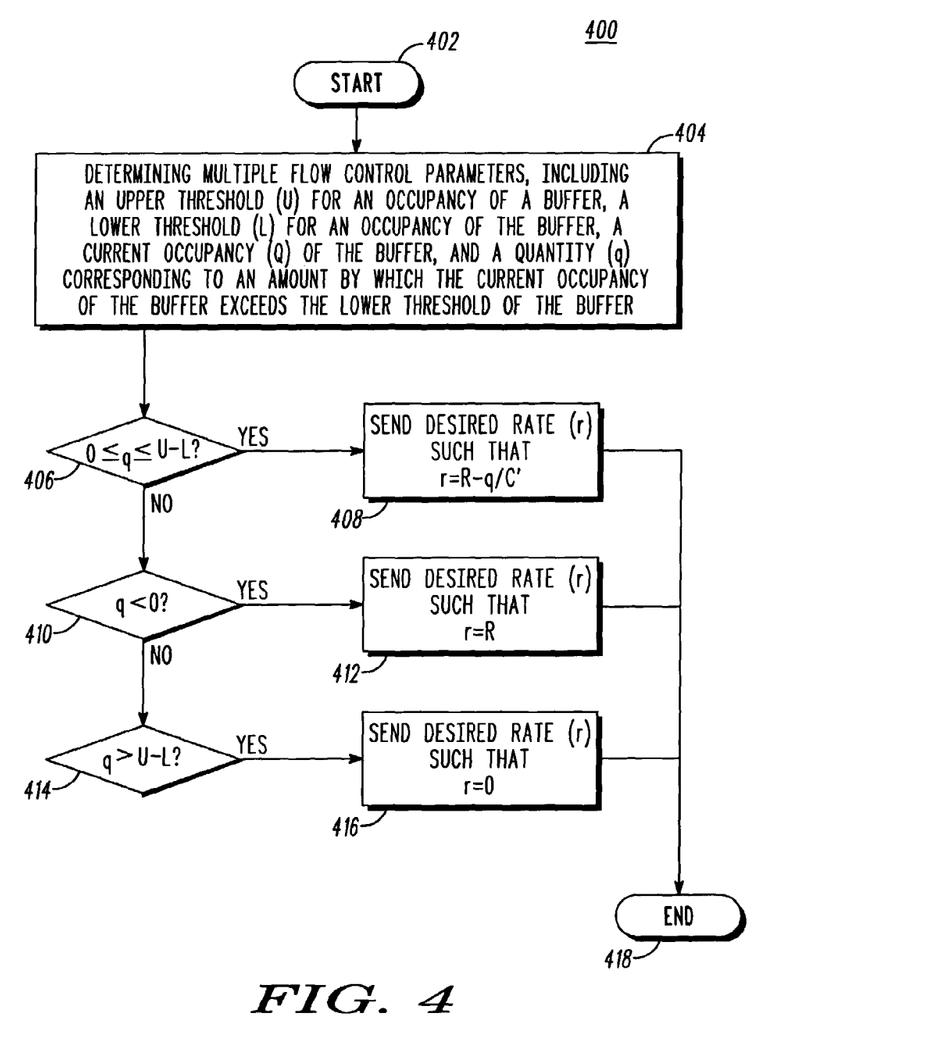
FIG. 4 is a logic flow diagram of a method executed by a node of the communication system of FIG. 2 in determining a desired data transfer rate in accordance with an embodiment of the present invention.
Figure 5:
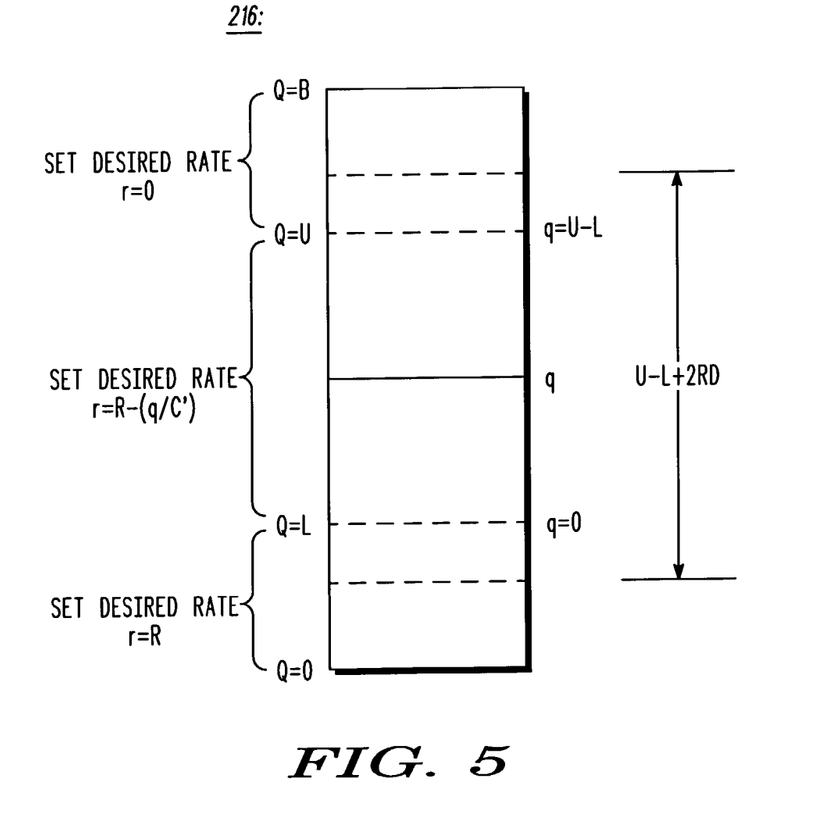
FIG. 5 is a block diagram of a buffer in illustration of a setting of a desired data rate corresponding to a level of occupancy of the buffer in accordance with an embodiment of the present invention.

Referring now to FIGS. 3, 4, and 5, a flow control mechanism of communication system 200 is illustrated that controls a rate at which data is transferred from node 202 to node 210. By controlling the data transfer rate, the flow control mechanism is further able to control an occupancy of buffer 216. FIG. 3 is a logic flow diagram 300 of the flow control mechanism in accordance with an embodiment of the present invention. Logic flow 300 begins (302) when node 210, in order to regulate a flow of data from node 202 to node 210, determines (304) whether a period of time, preferably a period of time at least as great as C', which parameter is defined below, has expired since an immediately preceding flow control message has been conveyed by node 210 to node 202. When a period of time at least as great as C' has expired since an immediately preceding flow control message has been conveyed by node 210, node 210 determines (306) a desired data transfer rate (r), preferably in bits per second, for a transfer of data from node 202 to node 210. Node 210 assembles (308) a flow control message 250 in which the node embeds the desired data transfer rate (r) and a maximum burst size ($B_{max}$). Node 210 then conveys (310) to node 202, and node 202 receives (312) from node 210, flow control message 250. In response to receiving flow control message 250, node 210 adjusts (314) a data rate corresponding to the transfer of data by node 202 to node 210 to produce an adjusted data rate. Node 202 subsequently conveys (316) data to node 210 at the adjusted data rate, and the logic flow ends (320). In another embodiment of the present invention, node 202 may further adjust (318) a size of buffer 208 in node 202 based on the received flow control message 250.

Referring now to FIGS. 4 and 5, a mechanism is illustrated by which node 210 determines (306) the desired data transfer rate (r). FIG. 4 is a logic flow diagram 400 of a method performed by processor 212 of node 210 in determining the desired data transfer rate (r) in accordance with an embodiment of the present invention. FIG. 5 is a block diagram of buffer 216 that illustrates a setting of a desired data rate (r) corresponding to a level of occupancy of the buffer in accordance with an embodiment of the present invention. Preferably all steps performed by node 202 as described with respect to logic flow diagrams 300 and 400 are performed by processor 204 of node 202, and all steps performed by node 210 as described with respect to logic flow diagrams 300 and 400 are performed by processor 212 of node 210.

Logic flow diagram 400 begins (402) when node 210 determines (404), and stores in memory devices 214, multiple flow control parameters 'B,' 'U,' 'L,' 'C',' 'Q,' and 'q.' In order to determine the multiple flow control parameters B, U, L, C', Q, and q, system 200 parameters 'C,' 'D,' 'R,' and 'M' may first be defined. System parameter C corresponds to a minimum spacing, in terms of a first time period, between successive flow control messages 250 conveyed by node 210 to node 202. System parameter D corresponds to a maximum enforcement delay, in terms of a second time period, at node 202. That is, D corresponds to a maximum amount of time that expires between an instant that node 210 send a flow control message to node 202 informing node 202 of a desired data transfer rate r and an instant that node 202 adjusts the data rate according to the desired data transfer rate r. System parameter R corresponds to a maximum data rate, preferably in bits per second, for a transfer of data to MS 224 over air interface 222, that is, a maximum rate at which data may be drawn from buffer 216 of node 210. System parameter M corresponds to a maximum size, preferably in bits, of a data packet. Preferably, '$B_{max}$,' is greater than or equal to M.

A first parameter, 'B,' of the multiple flow control parameters corresponds to a maximum size of buffer 216. Node 210, specifically processor 212, determines 'B' such that '$B \geq RC+2RD$.' A second parameter, 'U,' of the multiple flow control parameters corresponds to an upper threshold for an occupancy of buffer 216, that is, an amount of data stored in buffer 216, and is determined such that '$U \geq RC+RD$.' A third parameter, 'L,' of the multiple flow control parameters corresponds to a lower threshold for an occupancy of buffer 216, and is determined such that '$L \geq RD$.' The determinations of 'U' and 'L' by node 210, specifically processor 212, are further subject to the constraint that '$U-L \geq RC$.' A fourth parameter, 'C',' of the multiple flow control parameters corresponds to a time period elapsing between conveyance of a next flow control message and the immediately preceding flow control message. Node 210, specifically processor 212, determines C' such that '$C'=(U-L)/R$.'

In one embodiment of the present invention, each parameter of flow control parameters B, U, L, and C' may be freshly calculated with respect to the flow control message 250 being assembled. In other embodiments of the present invention, any one or more of flow control parameters B, U, L, and C' may be a predetermined parameter or may be determined with respect to a previous flow control message and stored in memory devices 214 of node 210. When a flow control parameter B, U, L, or C' is stored in memory devices 214, node 210 may determine the parameter by retrieving the parameter from the memory devices rather than recalculating the parameter.

A fifth parameter, 'Q,' of the multiple flow control parameters corresponds to a current occupancy of buffer 216, that is, an amount of data currently maintained in buffer 216. A sixth parameter, 'q,' of the multiple flow control parameters corresponds to a quantity by which the data currently maintained in buffer 216 exceeds the minimum occupancy threshold 'L,' that is, '$q=Q-L$.'

Processor 216 then determines a desired data rate r by comparing (406, 410, 414) q to one or more of zero (0) and a difference between the upper buffer occupancy threshold (U) and the lower buffer threshold (L), that is, U-L. When $0 \leq q \leq U-L$, then processor 216 sets $r=R-(q/C')$ (steps 406 and 408). When $q \leq 0$, then processor 216 sets $r=R$ (steps 410 and 412). When $q \geq U-L$, then processor 216 sets r=0 (zero) (steps 414 and 416). Logic flow 400 then ends (418).

Referring again to FIG. 3 and as described above, upon receiving the flow control message 250 with the desired data rate r, node 202 implements the desired data rate in subsequent transmissions of data intended for MS 224 to node 210. In addition, the step of assembling (308) flow control message 250 may further include embedding flow control parameter 'B' in the flow control message and the step of adjusting (316) may further include adjusting, by node 202, the size of buffer 208 based on the parameter 'B.'

By determining a desired data rate (r) based on the multiple flow control parameters that includes at least a current occupancy (Q) of buffer 216, an upper threshold (U) for an occupancy of the buffer, and a lower threshold (L) for an occupancy of the buffer, and conveying the desired data rate to node 202 in flow control message 250, node 210 is able to control a flow of data from node 202 to node 210 without relying on estimated data transfer rates over air interface 222 and such that an overflow and an underflow of buffer 216 is avoided. In another embodiment of the present invention, node 210 may also control a size of buffer 208 in node 202 by conveying to node 202, in flow control message 250, the flow control parameter 'B' which corresponds to a maximum size of buffer 216.

In yet another embodiment of the present invention, communication system 200 may further dynamically adjust a rate at which flow control messages 250 are conveyed by node 210 to node 202, thereby minimizing an amount of system 100 capacity consumed by such messages. Referring now to FIGS. 6A, 6B, 7, and 8, a flow control mechanism of communication system 200 is illustrated that controls a rate at which data is transferred from node 202 to node 210 in accordance with another embodiment of the present invention. Preferably all steps performed by node 202 as described below with respect to logic flow diagrams 600 and 700 are performed by processor 204 of node 202, and all steps performed by node 210 as described with respect to logic flow diagrams 600 and 700 are performed by processor 212 of node 210.

Figure 6A:
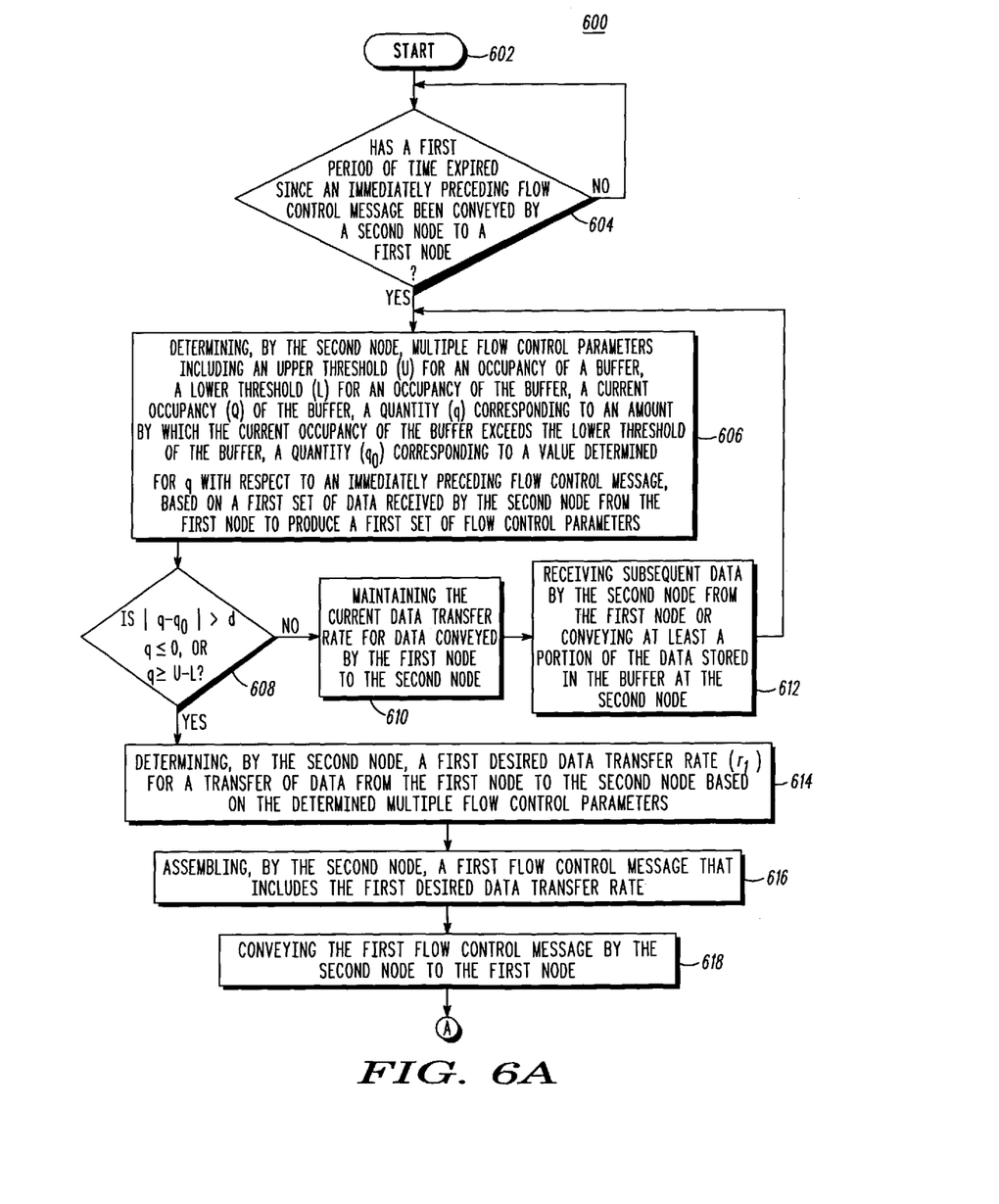
FIG. 6A is a logic flow diagram of a flow control mechanism in accordance with another embodiment of the present invention.
Figure 6B:
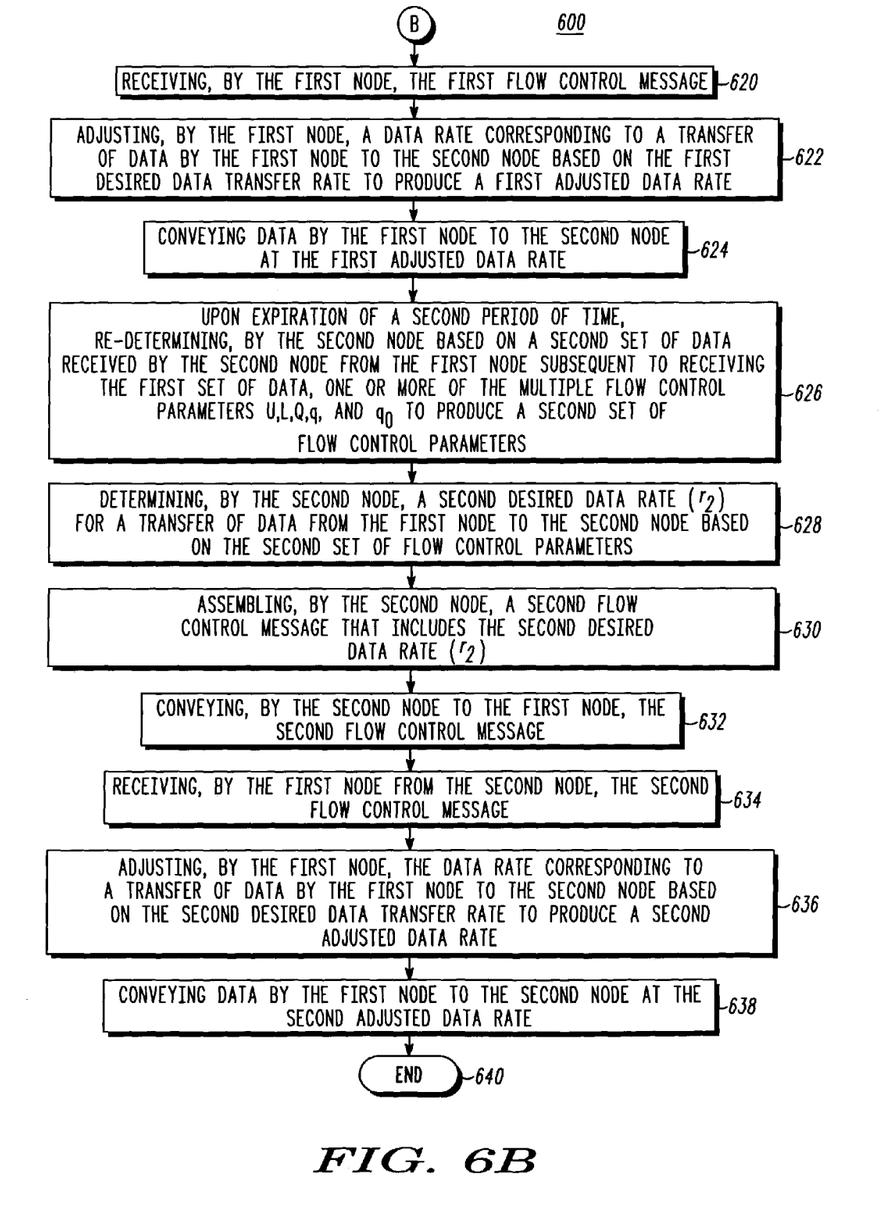
FIG. 6B is a continuation of the logic flow diagram of FIG. 6A of a flow control mechanism in accordance with another embodiment of the present invention.

FIGS. 6A and 6B are a logic flow diagram 600 of the flow control mechanism in accordance with another embodiment of the present invention. Logic flow 600 begins (602) when node 210, in order to regulate a flow of data from node 202 to node 210, determines (604) whether a first period of time, preferably a period of time at least as great as C', has expired since an immediately preceding flow control message has been conveyed by node 210 to node 202. When the first period of time has expired since an immediately preceding flow control message has been sent to node 202, node 210 determines (606), and stores in memory devices 214, the multiple flow control parameters 'B,' 'U,' 'L,' 'C',' 'Q,' 'q,' and a seventh flow control parameter '$q_0$,' based on a first set of data received from node 202 and stored in buffer 216, to produce a first set of flow control parameters. The flow control parameter $q_0$ corresponds to the value determined for 'q' with respect to the immediately preceding flow control message. As noted above, in one embodiment of the present invention, each parameter of flow control parameters B, U, L, and C' may be freshly calculated with respect to the flow control message 250 being assembled. In other embodiments of the present invention, any one or more of flow control parameters B, U, L, and C' may be a predetermined parameter or may be determined with respect to a previous flow control message and stored in memory devices 214 of node 210.

Based on the determined multiple flow control parameters, node 210 determines (608) whether to convey a first flow control message 250 to node 202. Preferably, step (608) comprises determining whether a difference between q and $q_0$ exceeds an adjustment threshold 'd,' whether q is less than or equal to zero (0), or whether q is greater than or equal to a difference between the upper threshold (U) and the lower threshold (L), that is, whether '$|q-q_0|>d$, $q \leq 0$, or $q \geq U-L$.' Preferably 'd' is a predetermined value whose value may be determined by the designer of communication system 200 but whose value is less than or equal to $\min(q_0, (U-L)-q_0)$, although those who are of ordinary skill in the art realize that larger values of d may be used herein without departing from the spirit and scope of the present invention. For example, a value of d may be sufficiently large that the upper and lower thresholds, that is, U and L, may be reached before reaching the 'd' threshold. A value for 'd' is selected such that the rate r, at which rate data is transferred from node 202 to node 210, will not be adjusted for every change in the data rate over air interface 222 but is adjusted whenever changes in the data rate over the air interface may cause a sufficiently large drift in the occupancy of buffer 216. That is, a value for 'd' is selected such that a flow control message is not sent every time the data rate over air interface 222 changes but instead is only sent when changes in the data rate over the air interface may cause an overflow or an underflow of buffer 216 in node 210. When $|q-q_0| \leq d$, $q>0$, and $q<U-L$, node 210 determines (610) not to adjust the transfer rate at which the node is receiving data from node 202 and upon receiving (612) a subsequent data packet from node 202 or upon node 210 conveying at least a portion of the data stored in buffer 216, thereby causing a resizing of buffer 216, logic flow 600 returns to step 606. When $|q-q_0|>d$, $q \leq 0$, or $q \geq U-L$, node 210 determines (614) a first desired data transfer rate ($r_1$) for a transfer of data from node 202 to the node 210.

Figure 7:
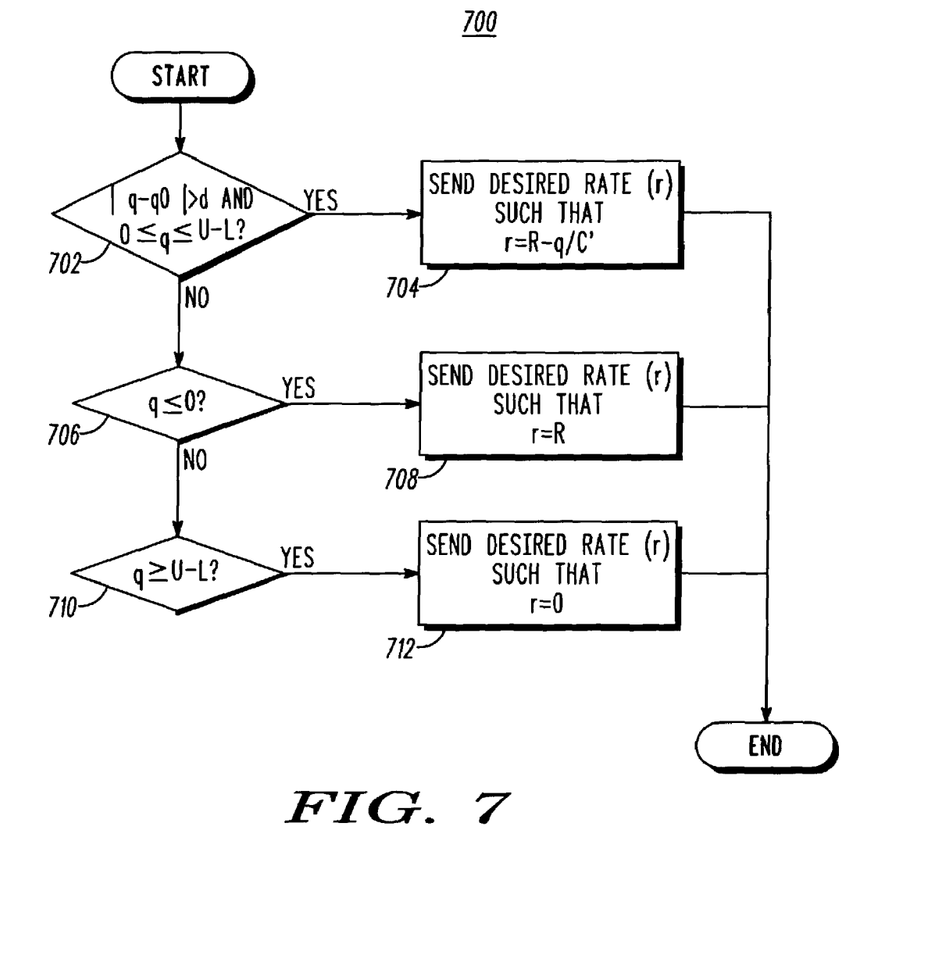
FIG. 7 is a logic flow diagram of a method executed by a node of the communication system of FIG. 2 in determining a desired data transfer rate in accordance with another embodiment of the present invention.
Figure 8:
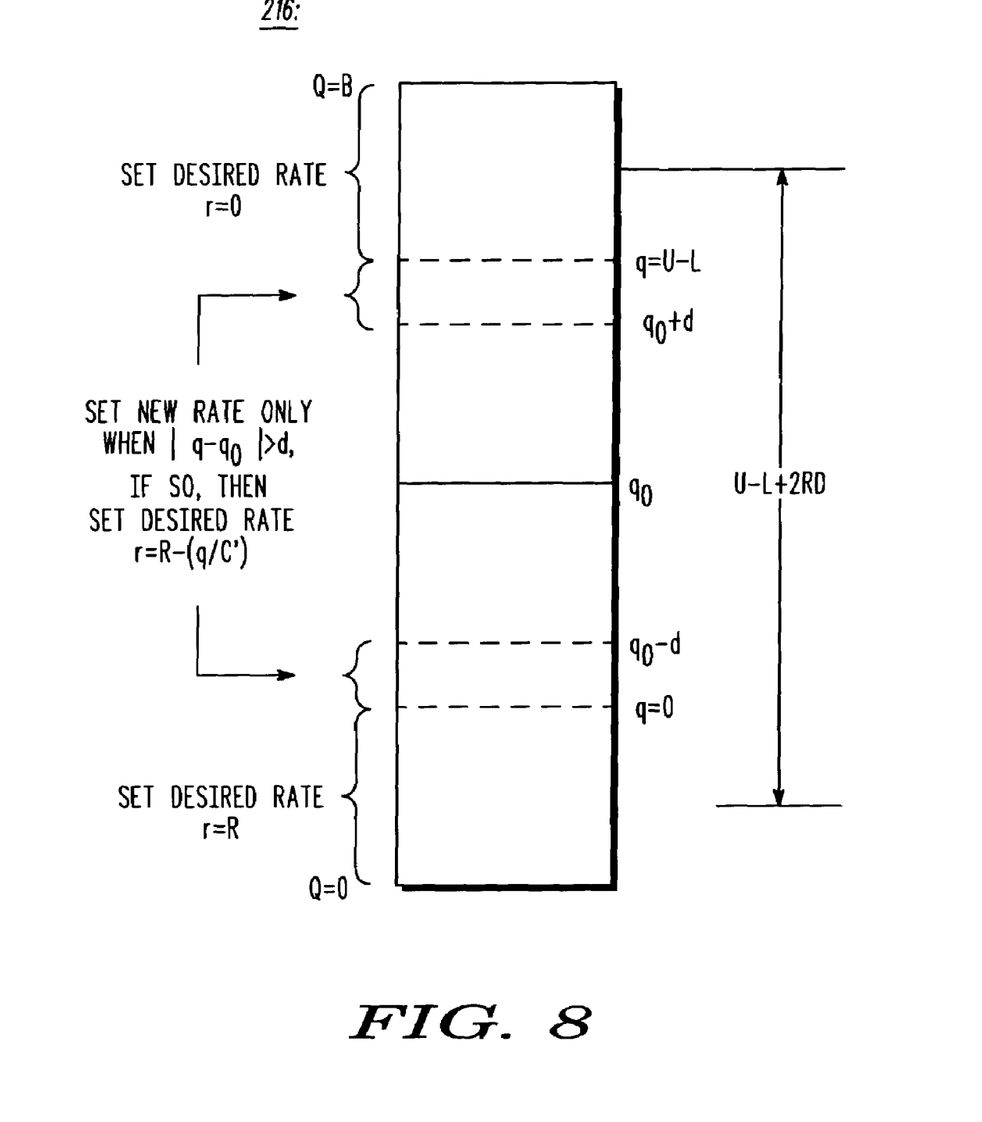
FIG. 8 is a block diagram of a buffer in illustration of a setting of a desired data rate corresponding to a level of occupancy of the buffer in accordance with another embodiment of the present invention.

Referring now to FIGS. 7 and 8, a mechanism is depicted for determining a desired data transfer rate (r), such as first desired data transfer rate ($r_1$), in accordance with another embodiment of the present invention. FIG. 7 is a logic flow diagram 700 of a procedure performed by node 210 in determining (614) a desired transfer rate (r), such as first desired data transfer rate ($r_1$) in accordance with another embodiment of the present invention. FIG. 8 is a block diagram of buffer 216 and an illustration of a setting of a desired data rate (r) corresponding to a level of occupancy of the buffer in accordance with another embodiment of the present invention. As depicted in FIGS. 7 and 8, when $|q-q_0|>d$ and $0 \leq q \leq U-L$, then node 210, preferably processor 212, sets the desired data rate $r=R-q/C'$ (steps 702 and 704). When $q \leq 0$ then node 210, preferably processor 212, sets the desired data rate $r=R$ (steps 706 and 708). When $q \geq U-L$, then node 210, preferably processor 212, sets the desired data rate $r=0$ (zero) (steps 710 and 712).

Referring again to FIGS. 6A and 6B, upon determining a first desired data transfer rate ($r_1$) in accordance with the procedure illustrated by FIGS. 7 and 8, node 210, specifically processor 212, then assembles (616) a first flow control message 250 in which the node embeds the determined first desired data rate ($r_1$) and a maximum burst size ($B_{max}$). Node 210 conveys (618) to node 202, and node 202 receives (620) from node 210, the first flow control message 250. In response to receiving the first flow control message, node 202 adjusts (622) a data rate corresponding to the transfer of data by node 202 to node 210 based on the first desired data rate ($r_1$) to produce a first adjusted data rate. Node 202 subsequently conveys (624) data to node 210 at the first adjusted data rate.

Upon an expiration of a second period of time after the conveyance of the first flow control message to node 202, node 210 re-determines (626) one or more of the multiple flow control parameters 'B,' 'U,' 'L,' 'C',' 'Q,' 'q,' and '$q_0$,' based on a second set of data received by node 210 subsequent to the first set of data and stored by node 210 in buffer 216, to produce a second set of flow control parameters. Those who are of ordinary skill in the art realize that one or more of the multiple flow control parameters, such as one or more of 'B,' 'U,' 'L,' and 'C',' may not need to be re-determined and may instead be retrieved by processor 212 of node 210 from memory device 214 in order to produce the second set of flow control parameters.

Based on the second set of flow control parameters, node 210 determines (628), pursuant to the procedure described above with respect to FIGS. 7 and 8, a second desired data rate ($r_2$) for a transfer of data from node 202 to the node 210. Upon an expiration of a second period of time, preferably a period of time equal to C', node 210 assembles (630), and conveys (632) to node 202, a second flow control message 250 that includes the second desired data transfer rate ($r_2$). In response to receiving (634) the second flow control message, node 202 adjusts (636) the data rate corresponding to the transfer of data by node 202 to node 210 based on the desired data rate ($r_2$) to produce a second adjusted data rate. Node 202 subsequently conveys (638) data to node 210 at the second adjusted data rate, and logic flow 600 ends (640). Similar to logic flow 300, the steps of assembling (610, 620) the first and second flow control messages may each further include embedding the flow control parameter 'B' in the respective flow control messages, and the respective steps of adjusting (614, 624) may each further comprise adjusting, by node 202, the size of buffer 208 based on the parameter 'B.'

By utilizing an adjustment threshold 'd,' communication system 100 is able to dynamically adjust, and thereby minimize, a rate at which flow control messages 250 are conveyed by node 210 to node 202. By utilizing the adjustment threshold in determining whether to convey a flow control message, a flow control message is not sent every time the data rate over air interface 222 changes but instead is sent only when changes in the data rate over the air interface may cause an overflow or an underflow of buffer 216 in node 210.

Furthermore, communication system 100 controls the data transfer rate from first node 202 to second node 210 merely by adjusting the desired data rate (r). Node 210 determines multiple flow control parameters, including a current occupancy (Q) of buffer 216 and an upper threshold (U) and a lower threshold (L) for an occupancy of buffer 216 and determines a desired data rate (r) based on the multiple flow control parameters. Node 210 may then convey the desired data rate (r) to node 202 in a flow control message 250 and node 202 may use the desired data rate (r) to adjust a data rate for the flow of data from node 202 to node 210. As a result, node 202 may adjust the data transfer rate by simply adjusting a time spacing between data packets conveyed by node 202 to the node 210 so as to meet the desired data rate (r). This is much simpler to implement than a typical 'leaky bucket' flow control mechanism of the prior art that requires a computation of the parameters r and $B_{max}$, and that typically rely on estimated data transfer rates over air interface 222. Furthermore, communication system 100 controls the data transfer rate such that an overflow and an underflow of buffer 216 in node 210 is avoided, which the prior art flow control schemes are unable to assure. In addition, communication system provides for dynamic control of a rate at which flow control messages 250 are conveyed by the second node to the first node, thereby minimizing an amount of system capacity consumed by such messages.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for controlling a data rate for a transfer of data from a first node of a plurality of nodes in a communication system to a second node of the plurality of nodes, the method comprising:

determining whether a period of time has expired since an immediately preceding flow control message has been conveyed by the second node to the first node;

when the period of time has expired, determining a plurality of flow control parameters comprising a current occupancy (Q) of a buffer of the second node, an upper threshold (U) for an occupancy of the buffer, and a lower threshold (L) for an occupancy of the buffer; and determining a desired data rate (r) based on the determined plurality of flow control parameters; wherein the desired data rate can be used to adjust the data rate and wherein determining a desired data rate comprises:

determining a quantity (q) corresponding to an amount by which the current occupancy (Q) of the buffer exceeds the lower threshold (L);

determining a difference between the upper threshold (U) and the lower threshold (L);

determining a time period (C') based on a maximum data rate (R) for a transfer of data over an air interface, the upper threshold (U), and the lower threshold (L); and when the quantity (q) is less than the difference between the upper threshold (U) and the lower threshold (L) and the quantity (q) is greater than zero, determining a desired data rate (r) based on the maximum data rate (R), the quantity (q), and the time period (C').

2. A method for controlling a data rate for a transfer of data from a first node of a plurality of nodes in a communication system to a second node of the plurality of nodes, the method comprising:

determining whether a period of time has expired since an immediately preceding flow control message has been conveyed by the second node to the first node;

when the period of time has expired, determining a plurality of flow control parameters comprising a current occupancy (O) of a buffer of the second node, an upper threshold (U) for an occupancy of the buffer, and a lower threshold (L) for an occupancy of the buffer; and determining a desired data rate (r) based on the determined plurality of flow control parameters, wherein the desired data rate can be used to adjust the data rate and wherein determining a desired data rate comprises:

determining a quantity (q) corresponding to an amount by which the current occupancy (Q) of the buffer exceeds the lower threshold (L);

determining whether the quantity (q) is less than zero; and when the quantity (q) is less than zero, determining a desired data rate based on a maximum data rate (R) for a transfer of data over an air interface.

3. A method for controlling a data rate for a transfer of data from a first node of a plurality of nodes in a communication system to a second node of the plurality of nodes, the method comprising:

determining whether a period of time has expired since an immediately preceding flow control message has been conveyed by the second node to the first node;

when the period of time has expired, determining a plurality of flow control parameters comprising a current occupancy (O) of a buffer of the second node, an upper threshold (U) for an occupancy of the buffer, and a lower threshold (L) for an occupancy of the buffer; and determining a desired data rate (r) based on the determined plurality of flow control parameters, wherein the desired data rate can be used to adjust the data rate and wherein determining a desired data rate comprises:

determining a quantity (q) corresponding to an amount by which the current occupancy (Q) of the buffer exceeds the lower threshold (L);

determining a difference between the upper threshold (U) and the lower threshold (L); and when the quantity (q) is greater than the difference between the upper threshold (U) and the lower threshold (L), determining a desired data rate approximately equal to zero.

4. The method of claim 1, further comprising:

embedding, by the second node, the desired data rate (r) in a flow control message; and conveying, by the second node to the first node, the flow control message.

5. The method of claim 4, further comprising adjusting, by the first node, the data rate at which the first node conveys data to the second node based on the desired data rate (r).

6. A method for controlling a data rate for a transfer of data from a first node of a plurality of nodes in a communication system to a second node of the plurality of nodes, the method comprising:
  determining whether a period of time has expired since an immediately preceding flow control message has been conveyed by the second node to the first node;
  when the period of time has expired, determining a plurality of flow control parameters comprising a current occupancy (O) of a buffer of the second node, an upper threshold (U) for an occupancy of the buffer, and a lower threshold (L) for an occupancy of the buffer;
  determining a desired data rate (r) based on the determined plurality of flow control parameters, wherein the desired data rate can be used to adjust the data rate;
  determining a maximum size (B) of the buffer of the second node; and
  adjusting, by the first node, a size of a buffer of the first node based on the maximum size (B) of the buffer of the second node.

7. A method for controlling a data rate for a transfer of data from a first node of a plurality of nodes in a communication system to a second node of the plurality of nodes, the method comprising:
  determining whether a period of time has expired since a conveyance of a preceding flow control message from the second node to the first node;
  determining a plurality of flow control parameters comprising a current occupancy (Q) of a buffer of the second node, an upper threshold (U) for an occupancy of the buffer, a lower threshold (L) for an occupancy of the buffer, a quantity (q) corresponding to an amount by which the current occupancy (Q) of the buffer exceeds the lower threshold (L), and a quantity ($q_0$) corresponding to a value determined for the quantity q with respect to the preceding flow control message;
  determining at least one of whether a difference between the quantity (q) and the quantity ($q_0$) exceeds an adjustment threshold (d), whether the quantity (q) is less than or equal to zero (0), and whether the quantity (q) is greater than or equal to a difference between the upper threshold (U) and the lower threshold (L); and
  determining to adjust the data rate when the period of time has expired and the difference between the quantity (q) and the quantity ($q_0$) exceeds the adjustment threshold (d), the quantity (q) is less than or equal to zero (0), or the quantity (q) is greater than or equal to a difference between the upper threshold (U) and the lower threshold (L).

8. The method of claim 7, wherein the method further comprises:
  determining a desired data rate (r) based on the determined plurality of flow control parameters; and
  wherein the desired data rate (r) can be used to adjust the data rate.

9. The method of claim 8, wherein determining the desired data rate (r) comprises, when the quantity (q) is less than a difference between the upper threshold (U) and the lower threshold (L) and the quantity (q) is greater than zero, determining the desired data rate (r) based on a maximum data rate (R) for a transfer of data over an air interface, the quantity (q), and a time period expiring between a conveyance of successive flaw control messages from the second node to the first node.

10. The method of claim 8, wherein determining the desired data rate (r) comprises, when the quantity (q) is less than or equal to zero, determining the desired data rate (r) based on a maximum data rate (R) for a transfer of data over an air interface.

11. The method of claim 8, wherein determining the desired data rate (r) comprises, when the quantity (q) is greater than or equal to the difference between the upper threshold (U) and the lower threshold (L), determining the desired data rate (r) approximately equal to zero.

12. The method of claim 7, further comprising adjusting, by the first node, the data rate at which the first node conveys data to the second node based on the desired data rate (r).

13. The method of claim 12, wherein adjusting comprises:
  embedding, by the second node, the desired data rate (r) in a flow control message;
  conveying, by the second node to the first node, the flow control message; and
  in response to receiving the flow control message, adjusting, by the first node, the data rate at which the first node conveys data to the second node based on the desired data rate (r).

14. The method of claim 8, wherein the plurality of flow control parameters are determined based on a first set of data and comprise a first set of flow control parameters, wherein the period of time comprises a first period of time, wherein the desired data rate (r) comprises a first desired data rate ($r_1$), and wherein the method further comprises:
  embedding, by the second node, the first desired data rate ($r_1$) in a flow control message;
  conveying, by the second node to the first node, the flow control message;
  determining whether a second period of time has expired since the conveyance of the flow control message;
  when the second period of time has expired since the conveyance of the first flow control message, re-determining at least one of the plurality of flow control parameters based on a second set of data received subsequent to the first set of data to produce a second set of flow control parameters;
  determining a second desired data rate ($r_2$) based on the second set of flow control parameters; and
  wherein the second desired data rate ($r_2$) can be used to further adjust the data rate.

15. The method of claim 14, wherein the flow control message comprises a first flow control message and wherein the method further comprises:
  embedding, by the second node, the second desired data rate ($r_2$) in a second flow control message; and
  conveying, by the second node to the first node, the second flow control message.

16. The method of claim 15, further comprising adjusting, by the first node, the data rate at which the first node conveys data to the second node based on the second desired data rate ($r_2$).

17. A node in a wireless communication infrastructure, wherein the node receives data at a data rate from a different node in the communication system for transmission to a mobile station, the node comprising:
  at least one memory device comprising a buffer that stores data intended for mobile station; and
  a processor that determines whether a period of time has expired since the node conveyed an immediately preceding flow control message to the different node and, when the period of time has expired, determines a plurality of flow control parameters comprising a current occupancy in (Q) of the buffer, an upper threshold (U) for an occupancy of the buffer, and a lower threshold (L) for an occupancy of the buffer and determines a desired data rate (r) based on the determined plurality of flow control parameters, wherein the desired data rate can be used to adjust the data rate and wherein the processor determines a desired data rate by determining a quantity (q) corresponding to an amount by which the current occupancy (Q) of the buffer exceeds the lower threshold (L), determining a difference between the upper threshold (U) and the lower threshold (L), determining a time period (C') based on a maximum data rate (R) for a transfer of data over an air interface, the upper threshold (U), and the lower threshold (L), and when the quantity (q) is less than the difference between the upper threshold (U) and the lower threshold (L) and the quantity (q) is greater than zero, determining a desired data rate (r) based on a maximum data rate (R) for a transfer of data over an air interface, the quantity (q), and the time period (C').

18. A node in a wireless communication infrastructure, wherein the node receives data at a data rate from a different node in the communication system for transmission to a mobile station, the node comprising:
at least one memory device comprising a buffer that stores data intended for mobile station; and
a processor that determines whether a period of time has expired since the node conveyed an immediately preceding flow control message to the different node and, when the period of time has expired, determines a plurality of flow control parameters comprising a current occupancy (O) of the buffer, an upper threshold (U) for an occupancy of the buffer, and a lower threshold (L) for an occupancy of the buffer and determines a desired data rate (r) based on the determined plurality of flow control parameters, wherein the desired data rate can be used to adjust the data rate and wherein the processor determines a desired data rate by determining a quantity (q) corresponding to an amount by which the current occupancy (Q) of the buffer exceeds the lower threshold (L), determining whether the quantity (q) is less than zero, and when the quantity (q) is less than zero, determining a desired data rate based on a maximum data rate (A) for a transfer of data over an air interface.

19. A node in a wireless communication infrastructure, wherein the node receives data at a data rate from a different node in the communication system for transmission to a mobile station, the node comprising:
at least one memory device comprising a buffer that stores data intended for mobile station; and
a processor that determines whether a period of time has expired since the node conveyed an immediately preceding flow control message to the different node and, when the period of time has expired, determines a plurality of flow control parameters comprising a current occupancy (O) of the buffer, an upper threshold (U) for an occupancy of the buffer, and a lower threshold (L) for an occupancy of the buffer and determines a desired data rate (r) based on the determined plurality of flow control parameters, wherein the desired data rate can be used to adjust the data rate and wherein the processor determines a desired data rate by determining a quantity (q) corresponding to an amount by which the current occupancy (Q) of the buffer exceeds the lower threshold (L), determining a difference between the upper threshold (U) and the lower threshold (L), and when the quantity (q) is greater than the difference between the upper threshold (U) and the lower threshold (L), determining a desired data rate approximately equal to zero.

20. The node of claim 17, wherein the processor further embeds the desired data rate (r) in a flow control message and conveys the flow control message to the different node.

21. The node of claim 17, wherein the processor further determines a maximum size (B) of the buffer of the second node and conveys the maximum size (B) of the buffer to the different node.

22. A node in a wireless communication infrastructure, wherein the node receives data at a data rate from a different node in the communication system for transmission to a mobile station, the node comprising:
at least one memory device that stores an adjustment threshold (d) and that comprises a buffer that stores data intended for mobile station; and
a processor that determines whether a period of time has expired since the node conveyed a preceding flow control message to the different node; determines a plurality of flow control parameters comprising a current occupancy (Q) of the buffer, an upper threshold (U) for an occupancy of the buffer, a lower threshold (L) for an occupancy of the buffer, a quantity (q) corresponding to an amount by which the current occupancy (Q) of the buffer exceeds the lower threshold (L), and a quantity ($q_o$) corresponding to a value determined for the quantity q with respect to the preceding flow control message, determines at least one of whether a difference between the quantity (q) and the quantity ($q_o$) exceeds the adjustment threshold (d), whether the quantity (q) is less than or equal to zero (0), and whether the quantity (q) is greater than or equal to a difference between the upper threshold (U) and the lower threshold (L), and determines to adjust the data rate when the period of time has expired and the difference between the quantity (q) and the quantity ($q_o$) exceeds the adjustment threshold (d), the quantity (q) is less than or equal to zero (0), or the quantity (q) is greater than or equal to a difference between the upper threshold (U) and the lower threshold (L).

23. The node of claim 22, wherein the processor further determines a desired data rate (r) based on the determined plurality of flow control parameters and wherein the desired data rate (r) can be used to adjust the data rate.

24. The node of claim 23, wherein when the quantity (q) is less than the difference between the upper threshold (U) and the lower threshold (L) and the quantity (q) is greater than zero, the processor determines the desired data rate (r) based on a maximum data rate (R) for a transfer of data over an air interface, the quantity (q) and a time period expiring between a conveyance of successive flow control messages by the node.

25. The node of claim 23, wherein when the quantity (q) is less than or equal to zero, the processor determines the desired data rate (r) based on a maximum data rate (R) for a transfer of data over an air interface.

26. The node of claim 23, wherein when the quantity (q) is greater than or equal to the difference between the upper threshold (U) and the lower threshold (L), the processor determines the desired data rate (r) approximately equal to zero.

27. The node of claim 23, wherein the processor further embeds the desired data rare (r) in a flow control message and conveys the flow control message to the different node.

28. The node of claim 23, wherein the plurality of flow control parameters are determined based on a first set of data and comprise a first set of flow control parameters, wherein the period chime comprises a first period of time, wherein the desired data rate (r) comprises a first desired data rate ($r_1$), and wherein processor further embeds the first desired data rate ($r_1$) in a flow control message, conveys the flow control message to the different node, determines whether a second period of time has expired since the conveyance of the flow control message and when the second period of time has expired since the conveyance of the first flow control message, re-determines at least one of the plurality of flow control parameters based on a second set of data received subsequent to the first set of data to produce a second set of flow control parameters and determines a second desired data rare ($r_2$) based on the second set of flow control parameters, wherein the second desired data rate can be used to further adjust the data rate.

29. The node of claim 28, wherein the flow control message comprises a first flow control message and wherein the processor further embeds the second desired data rate ($r_2$) in a second flow control message and conveys the second flow control message to the different node.

* * * * *